United States Patent
Kolanowski (10) Patent No.: US 9,277,397 B2
(45) Date of Patent: Mar. 1, 2016

(54) EFFICIENT SUBSCRIBER DEVICE MANAGEMENT USING PROFILE IDENTIFIERS

(71) Applicant: Cellco Partnership, Arlington, VA (US)

(72) Inventor: Stephen J. Kolanowski, Westlake, TX (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/289,315

(22) Filed: May 28, 2014

(65) Prior Publication Data

US 2015/0350884 A1 Dec. 3, 2015

(51) Int. Cl.
*H04M 3/00* (2006.01)
*H04W 8/22* (2009.01)
*H04L 29/08* (2006.01)

(52) U.S. Cl.
CPC .............. *H04W 8/22* (2013.01); *H04L 67/306* (2013.01)

(58) Field of Classification Search
USPC ................................ 455/419; 725/116, 32, 39
See application file for complete search history.

(56) References Cited

U.S. PATENT DOCUMENTS

| 2012/0079529 | A1* | 3/2012 | Harris et al. ................ 725/32 |
| 2013/0035082 | A1* | 2/2013 | Sen .................. H04W 4/18 455/414.4 |
| 2014/0119195 | A1* | 5/2014 | Tofighbakhsh ... H04W 52/0251 370/241 |
| 2015/0256581 | A1* | 9/2015 | Kolhi .................. H04L 65/602 709/219 |

OTHER PUBLICATIONS

Open Mobile Alliance, "OMA Device Management Standardized Objects: OMA-TS-DM_StdObj-V1_2_1-20080617-A," Approved Version 1.2.1—Jun. 17, 2008 (available at http://technical.openmobilealliance.org/Technical/release_program/docs/DM/V1_2_1-20080617-A/OMA-TS-DM_StdObj-V1_2_1-20080617-A.pdf, visited Apr. 14, 2014).

\* cited by examiner

*Primary Examiner* — David Q Nguyen (57) ABSTRACT

A system may be configured to receive profile identifiers from a set of user devices; identify, based on the profile identifiers, one or more user devices, of the set of user devices, for which updated parameters should be provided, the parameters relating to operation of the one or more user devices with respect to a telecommunications network; and provide, to the identified one or more user devices, the updated parameters.

20 Claims, 8 Drawing Sheets

| Profile ID: SDMPID_A | |
|---|---|
| Parameter | Value |
| SIP max attempts | 4 |
| SIP timer | 7 sec |
| LTE/1X fallback timer | 5 sec |

310

| Profile ID: SDMPID_B | |
|---|---|
| Parameter | Value |
| SIP max attempts | 3 |
| SIP timer | 6 sec |

EFFICIENT SUBSCRIBER DEVICE MANAGEMENT USING PROFILE IDENTIFIERS

BACKGROUND

Service providers, such as providers of wireless telecommunications networks, may provide parameters to user devices. These parameters may dictate some aspects of the operation of the user devices, with respect to communications via a particular wireless telecommunications network. Some example parameters may include parameters relating to fallback timers, retry limits, timeout timers, and/or other parameters.

DETAILED DESCRIPTION OF PREFERRED EMBODIMENTS

The following detailed description refers to the accompanying drawings. The same reference numbers in different drawings may identify the same or similar elements.

Service providers, such as providers of wireless telecommunications networks, may provide parameters to user devices. These parameters may dictate some aspects of the operation of the user devices, with respect to communications via a particular wireless telecommunications network. Some example parameters may include parameters relating to fallback timers, retry limits, timeout timers, and/or other parameters. "Subscriber device management" ("SDM") may refer to the management of a set of parameters, installed at a user device, without the need to modify the firmware, operating system, and/or other software associated with the user device. Determining which parameters are installed at which user devices may be problematic for a service provider, as such a determination may involve requesting and processing a large amount of data (e.g., potentially dozens of parameters from millions of user devices). Furthermore, providing update parameters through a different process (e.g., via updating device firmware) may be burdensome, as many parties may need to be involved (e.g., original equipment manufacturers ("OEMs") of multiple different devices may need to be involved to generate firmware updates for the multiple different devices).

As provided herein, some implementations may provide SDM profiles, in order to allow the expedient determination of user devices for which SDM parameters should be provided. An "SDM profile," as used herein, may refer to a set of SDM parameters, and values that relate to the parameters. The SDM parameters may include parameters relating to the operation of user devices with respect to a wireless telecommunications network. Example SDM parameters may include, for instance, timers (e.g., timers relating to timeouts of communications, timers relating to when communications should be retried, etc.), retry attempts (e.g., how many attempts should be made to retry a particular communication if the communication was not successful), and/or other parameters. SDM profiles may be provided to user devices when user devices are "out-of-date" (e.g., some of the SDM parameters installed at the user devices are not consistent with a current set of target SDM parameters), while other user devices may be "up-to-date" (and therefore do not need to receive updated SDM parameters).

Figure 1A:
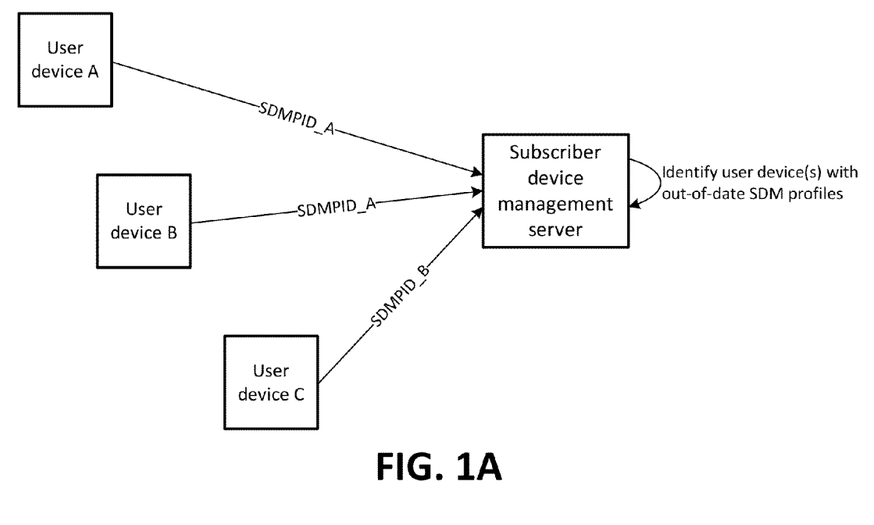
FIGS. 1A and 1B illustrate an example overview of one or more implementations described herein.

FIG. 1A illustrates three example user devices ("User devices A-C") providing SDM profile identifiers ("SDM-PIDs") to an SDM server. User devices A and B may include SDM profile A (e.g. an SDM profile having an SDM profile identifier "SDMPID_A"), while User device C may include profile B (e.g. an SDM profile having an SDM profile identifier "SDMPID_B"). The different SDM profiles may correspond to different sets of SDM parameters. For example, assume that SDM profile A corresponds to an "out-of-date" set of SDM parameters, while SDM profile B corresponds to an "up-to-date" set of SDM parameters. As shown, the user devices may provide respective SDM profile identifiers to the SDM server (e.g., in response to a request from the SDM server, and/or pushed to the SDM server without a request from the SDM server).

Figure 1B:
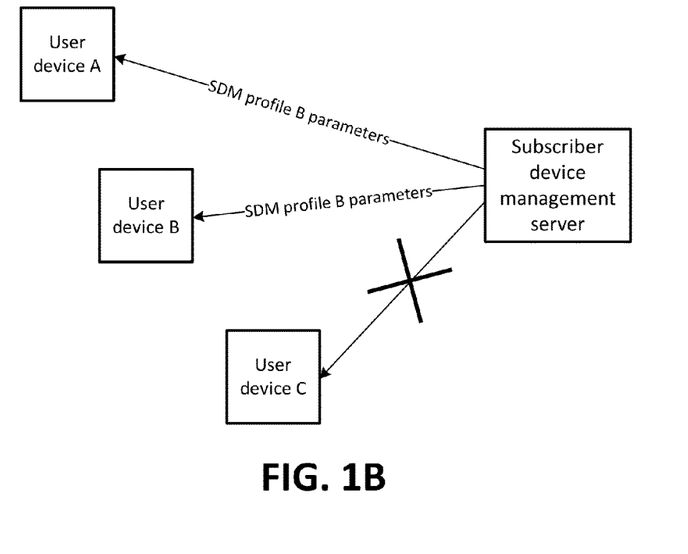

As shown in FIG. 1B, the SDM server may provide parameters, associated with SDM profile B to User devices A and B (e.g., based on the determination, shown in FIG. 1A, that these user devices are not associated with an up-to-date SDM profile). As also shown, the SDM server may refrain from providing these parameters to User device C, as User device C already has the desired SDM profile parameters installed. Identifying user devices, for which SDM parameters should be provided, based on SDM profile identifiers, may reduce the amount of data that needs to be sent to, and processed by, an SDM server (e.g., as compared to situations in which multiple parameters are provided to the SDM server from each user device). Furthermore, only providing SDM parameters to user devices, that have out-of-date SDM parameters installed, may reduce the amount of processing and/or network resources consumed by providing SDM parameters (e.g., as compared to situations in which SDM parameters are provided even to user devices that already have the SDM parameters installed).

Figure 2:
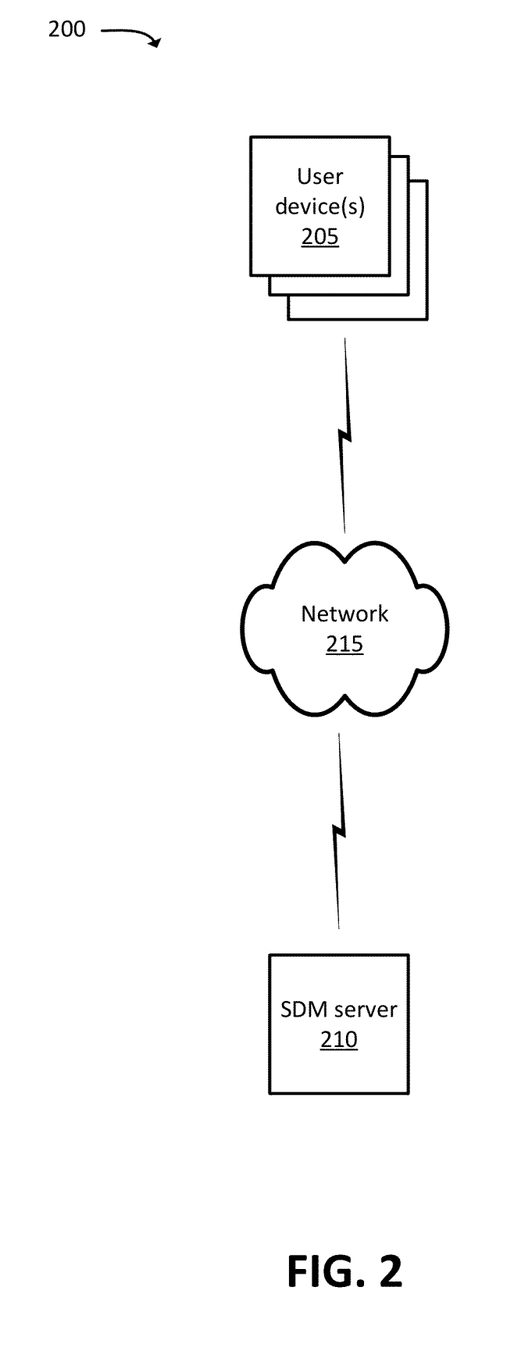
FIG. 2 illustrates examples of one or more environments in which systems and/or methods, described herein, may be implemented.

FIG. 2 illustrates an example environment 200, in which systems and/or methods described herein may be implemented. As shown in FIG. 2, environment 200 may include one or more user devices 205 (hereinafter sometimes referred to individually as "user device 205"), SDM server 210, and network 215.

User device 205 may include any computation and communication device, such as a wireless mobile communication device that is capable of communicating with SDM server 210 and/or network 215. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system; a network-enabled television; and/or another type of mobile computation and communication device. Some or all aspects of the operation of user device 205 (e.g., parameters relating to how user device 205 communicates with network 215) may be configurable via SDM parameters, as described below. For example, SDM parameters may relate to fallback timers (e.g., timers that track how long attempts have been made to attempt communicate via one technique before switching to attempting to communicate via another technique), retry attempts (e.g., a quantity of times to retry a particular type of communication before determining that the communication has failed), retry timers (e.g., an amount of time after which a particular communication has failed before attempting the communication again), and/or other types of parameters.

SDM server 210 may include one or more server devices that provide SDM parameters to user devices 205. For example, as described in further detail below, SDM server 210 may receive SDM profile identifiers from user devices 205, and determine, based on the SDM profile identifiers, which SDM parameters (if any) should be provided to which user devices 205.

Network 215 may include one or more wired and/or wireless networks. For example, network 215 may include a packet data network ("PDN"), such as an Internet Protocol ("IP")-based PDN. Network 215 may include, for example, a wide area network ("WAN") such as the Internet, a core network of a telecommunications provider, a private enterprise network, and/or one or more other networks. In some implementations, network 215 may include a radio access network ("RAN"), with which user device 205 may communicate wirelessly. For example, network 215 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a RAN that includes one or more base stations (which may take the form of an evolved Node B), via which user device 205 may communicate with the EPC network. The EPC network may include one or more serving gateways ("SGWs"), PDN gateways ("PGWs"), and/or mobility management entities ("MMEs"), and may enable user device 205 to communicate with other networks (e.g., the Internet, an IP multimedia subsystem ("IMS") core network, etc.).

Figure 3:
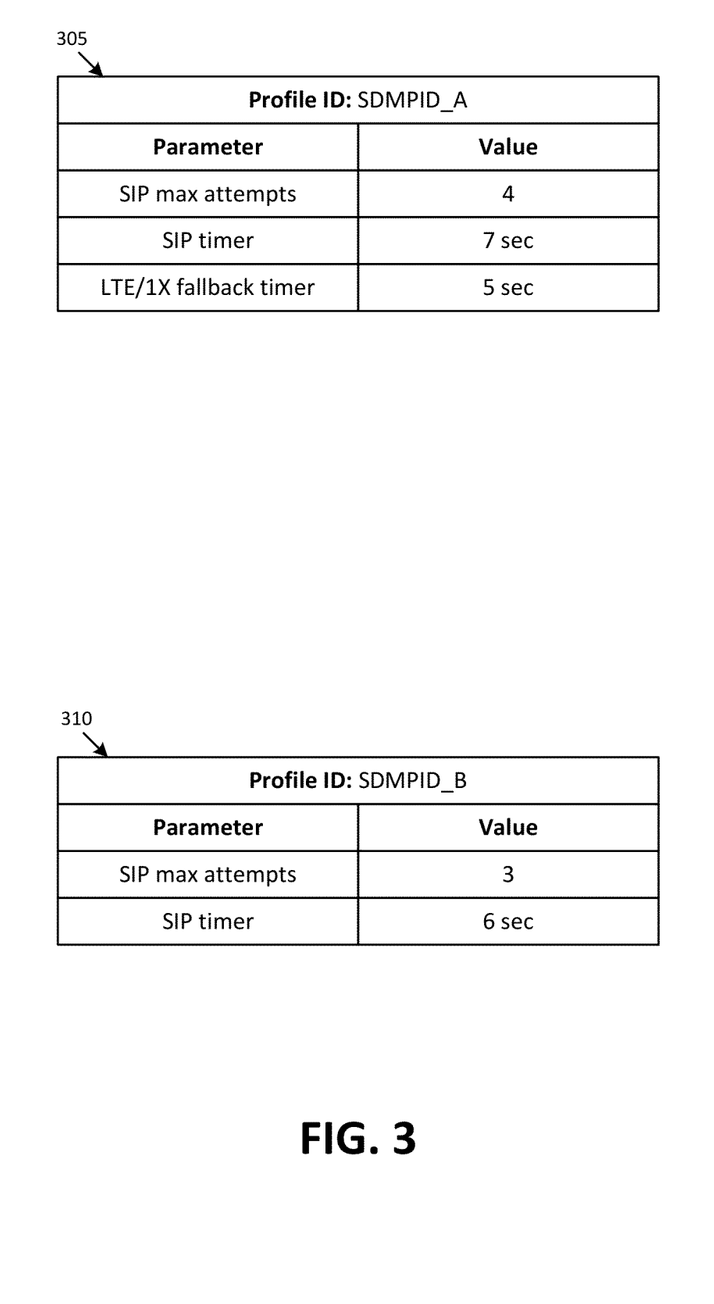
FIG. 3 illustrates example data structures that may correspond to subscriber device management ("SDM") profiles.

FIG. 3 illustrates example data structures 305 and 310, which may relate to different SDM profiles. For example, data structure 305 may correspond to an SDM profile named "SDMPID_A," while data structure 310 may correspond to an SDM profile named "SDMPID_B." Information regarding SDM profiles (e.g., instances of data structures 305 and 310, and/or instances of similar data structures) may be stored by individual user devices 205, SDM server 210, and/or by another device.

Each SDM profile (and thus, data structures that correspond to particular profiles) may include information regarding SDM parameters (e.g., "Parameter" fields), as well as values for each SDM parameter (e.g., "Value" fields). For instance, data structure 305 may include a profile identifier ("Profile ID") that indicates that data structure 305 includes information for a profile named "SDMPID_A." Data structure 305 may also include values for an example set of SDM parameters: 4 Session Initiation Protocol ("SIP") maximum ("max") attempts; a 7-second SIP timer (e.g., a T1 timer, a T2 timer, a T4 timer, and/or another timer related to, or specified by, an SIP standard), and a 5-second LTE/1X fallback timer (e.g., a timer related to attempting to communicate via a 1X network if attempted communications via an LTE network are unsuccessful). Data structure 310 may include values for some or all of the SDM parameters associated with data structure 305, and/or additional SDM parameters. As shown, data structure 310 may include values for another example set of SDM parameters, corresponding to a profile named "SPM-PID_B." The parameter values for this profile may include: 3 SIP max attempts; and a 6-second SIP timer.

As discussed below, different SDM profiles may include values for overlapping and/or non-overlapping sets of parameters, in varying implementations. As also discussed below, user devices 205 may output SDM profile identification information (e.g., information stored in data structure 305 and/or a similar data structure) to SDM server 210, which may use the SDM profile identification information to determine whether a particular user device 205 has an up-to-date SDM profile.

Figure 4A:
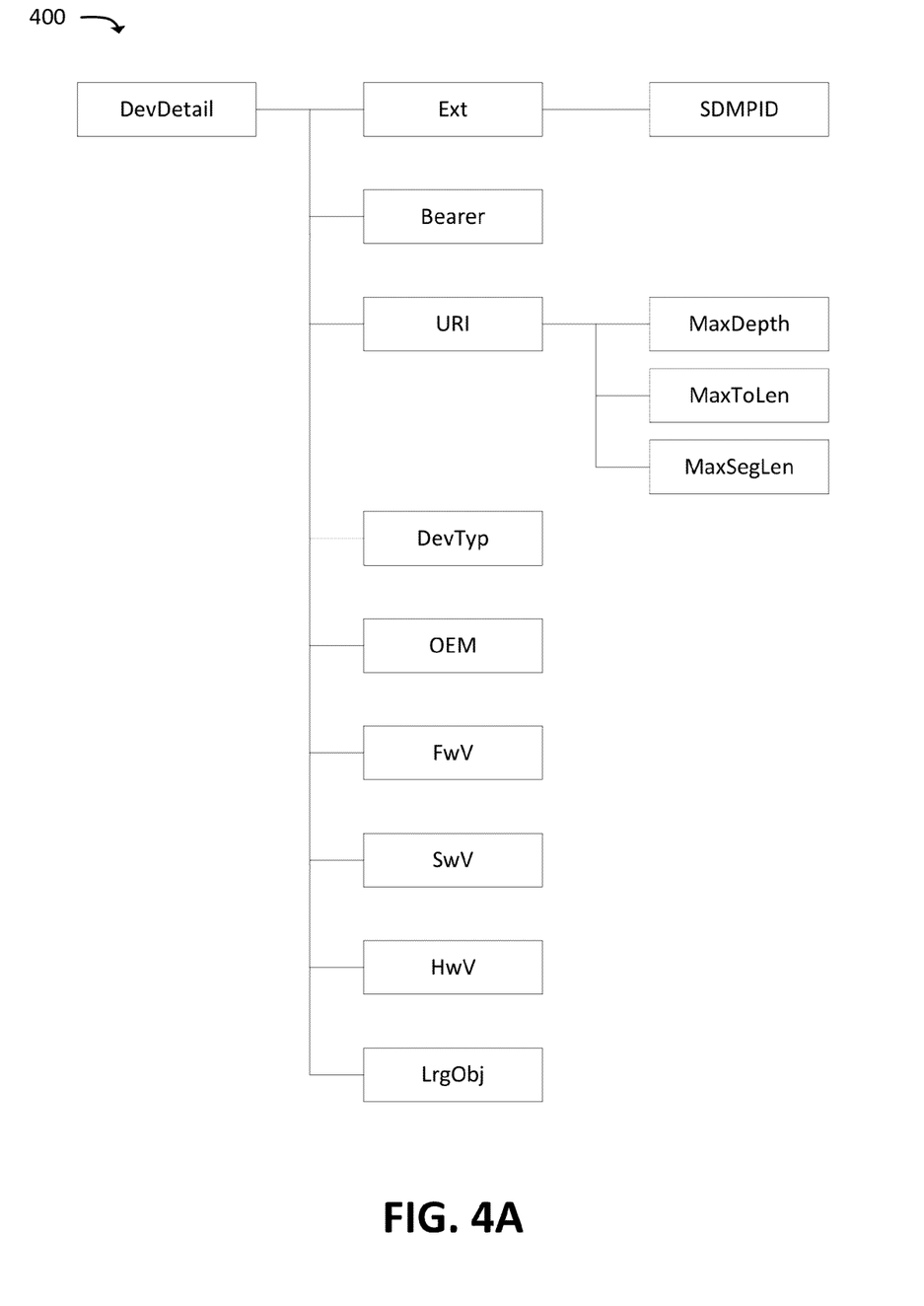
FIG. 4A illustrates an example DevDetail object (e.g., according to an Open Mobile Alliance Device Management ("OMA DM") standard), which may include an SDM profile identifier.

FIG. 4A illustrates another example data structure 400, which may include information regarding a particular user device 205. In some implementations, data structure 400 may be stored by user device 205, and may be provided (and/or portions of data structure 400 may be provided) upon request, such as to SDM server 210. Data structure 400 may correspond to, for example, a DevDetail object of an Open Mobile Alliance Device Management ("OMA DM") standard (e.g., as described in the document, "OMA Device Management Standardized Objects; Approved Version 1.2.1-17 Jun. 2008"). Some of the fields of data structure 400 are found in the above-referenced standard, and are not described here, for the sake of brevity.

The "Ext" field may include information not found in the above-referenced standards, and may be used in some implementations described herein. For example, the "Ext" field, in the example DevDetail object represented by data structure 400, may include an SDMPID field. The SDMPID field may include information identifying one or more SDM profiles associated with user device 205. For example, the SDMPID field may store information identifying the most recent SDM profile received by user device 205, and/or one or more other (e.g., all, a quantity of most recent, etc.) SDM profiles received and/or stored by user device 205. In some implementations, data structure 400 may be used by user device 205 and/or SDM server 210, in situations where the modification of parameters, associated with user device 205, is performed according to an OMA DM standard and/or using a similar technique.

Figure 4B:
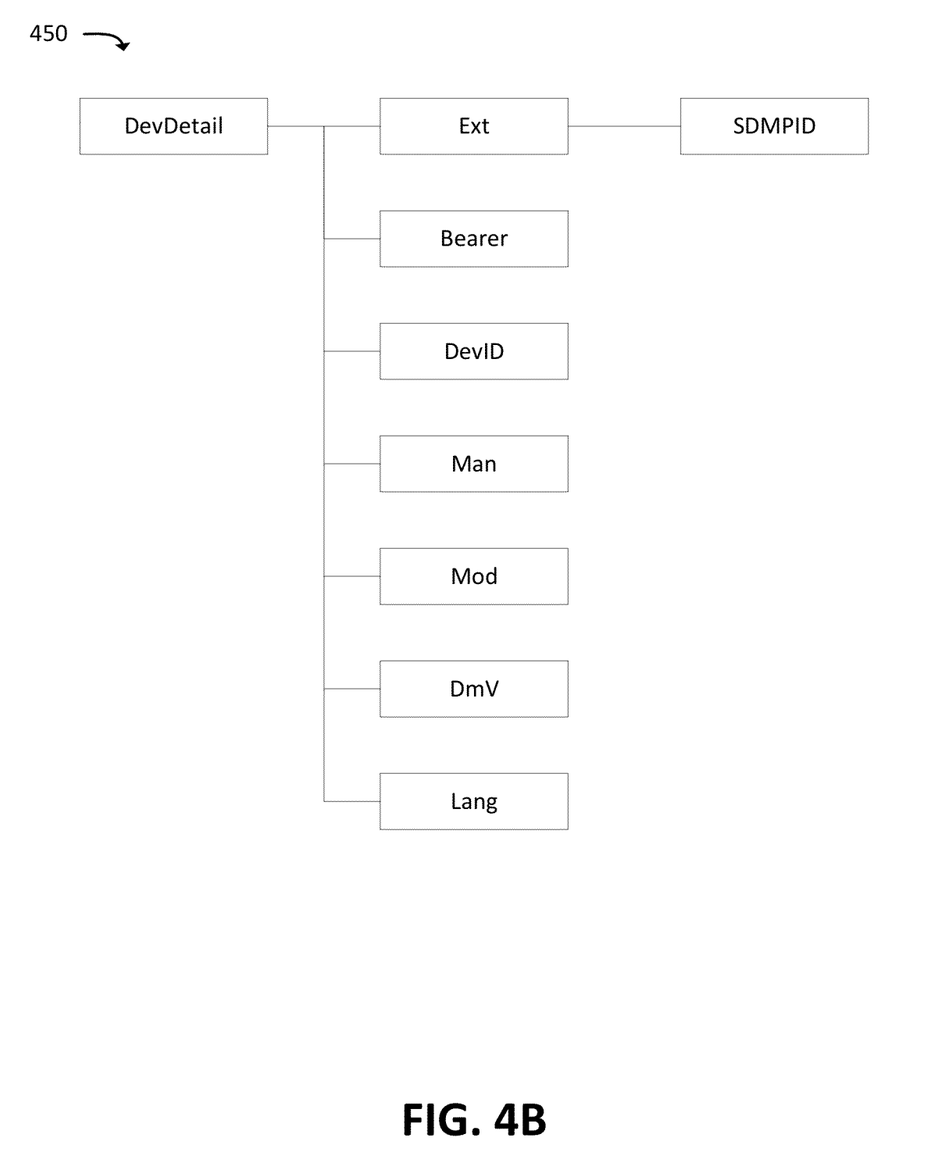
FIG. 4B illustrates an example DevInfo object, which may include an SDM profile identifier.

In some implementations, a DevInfo object may store information identifying one or more SDM profiles, in addition to, or in lieu of, a DevDetail object. For example, FIG. 4B illustrates an example data structure 450, which may correspond to a DevInfo object. As shown, an "Ext" field of the DevInfo object may include an SDMPID field, which may include information identifying one or more SDM profiles associated with user device 205.

Figure 5:
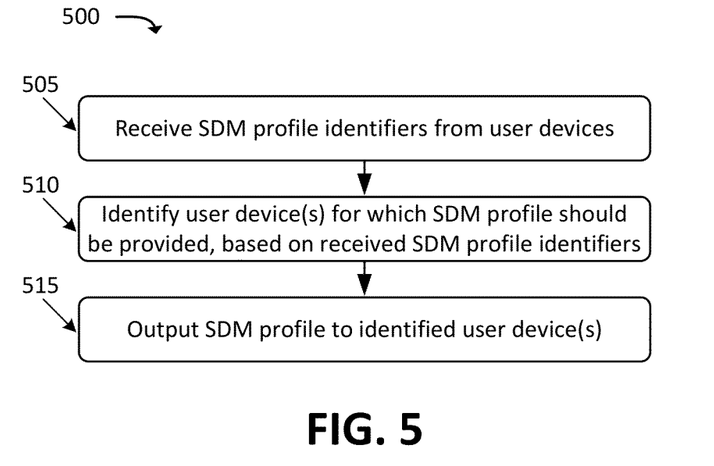
FIG. 5 illustrates an example process for providing parameters, via an SDM profile, to user devices that may not currently have the desired parameters.

FIG. 5 illustrates an example process 500 for providing an SDM profile to a user device. In some implementations, process 500 may be performed by SDM server 210. In some implementations, some or all of process 500 may be performed by one or more other devices in addition to, or in lieu of, SDM server 210.

As shown in FIG. 5, process 500 may include receiving (at 505) SDM profile identifiers from a set of user devices. For example, SDM server 210 may receive SDM profile identifiers, from one or more user devices 205, based requesting the SDM profile identifiers. For instance, in some implementations, SDM server 210 may periodically (e.g., once a week, once a month, etc.) and/or intermittently (e.g., when updated SDM parameters have been provided by a service provider and/or on another intermittent basis) request SDM profile identifiers from user devices 205 (e.g., user devices 205 associated with a particular telecommunications service provider). In some implementations, user devices 205 may "push" SDM profile identifiers to SDM server 210 (e.g., may provide SDM profile identifiers to SDM server 210 independent of a request from SDM server 210 for the SDM profile identifiers) on a periodic and/or intermittent basis. In some implementations, an SDM profile identifier, associated with a particular user device 205, may be received as part of a DevDetail object (e.g., as described above with respect to FIG. 4A), a DevInfo object (e.g., as described above with respect to FIG. 4B), etc.

Process 500 may also include identifying (at 510) one or more user devices for which an SDM profile should be provided, based on the received SDM profile identifiers. For example, SDM server 210 may maintain, or may receive information regarding, one or more SDM profile identifiers that correspond to an up-to-date SDM profile. For example, SDM server 210 may store and/or receive data structures similar to those shown in FIG. 3. The up-to-date SDM profile may include one or more SDM parameters (e.g., parameters relating to timers, retry attempts, and/or any type of parameter relating to the operation of user device 205 with respect to a particular network). When identifying a particular user device 205, for which an updated SDM profile should be provided, SDM server 210 may compare the SDM profile identifier(s) of the up-to-date SDM profile(s) to the SDM profile identifier(s) received from the particular user device 205. For example, assume that an up-to-date SDM profile has the SDM profile identifier "SDMPID_B" (e.g., an alphanumeric string) and the SDM profile identifier "SDMPID_A" (e.g., a different alphanumeric string) was received from user device 205. SDM server 210 may determine, since the SDM profile identifier, received from user device 205 does not match the up-to-date SDM profile identifier, that the SDM profile, having the SDM profile identifier "SDMPID_B," should be provided to user device 205.

In some implementations, multiple SDM profile identifiers may be received from one user device 205. In some such implementations, when identifying a particular user device 205, for which an updated SDM profile should be provided, SDM server 210 may determine whether the set of SDM profile identifiers, received from the particular user device 205, includes an up-to-date SDM profile identifier. If the set of set of SDM profile identifiers, received from the particular user device 205, does not include the up-to-date SDM profile identifier, SDM server 210 may determine that the up-to-date SDM profile should be provided to the particular user device 205.

Process 500 may further include outputting (at 515) an SDM profile to the identified user devices. For example, SDM server 210 may output an up-to-date SDM profile to the user device(s) 205, identified at 510. For example, SDM server 210 may output SDM parameters, associated with the SDM profile, to user device 205. In some implementations, outputting the SDM profile may be implemented using an OMA DM technique. For example, user device 205 and SDM server 210 may implement an OMA DM standard, in order to allow parameters on user device 205 to be changed by way of the SDM profile provided by SDM server 210.

Figure 6:
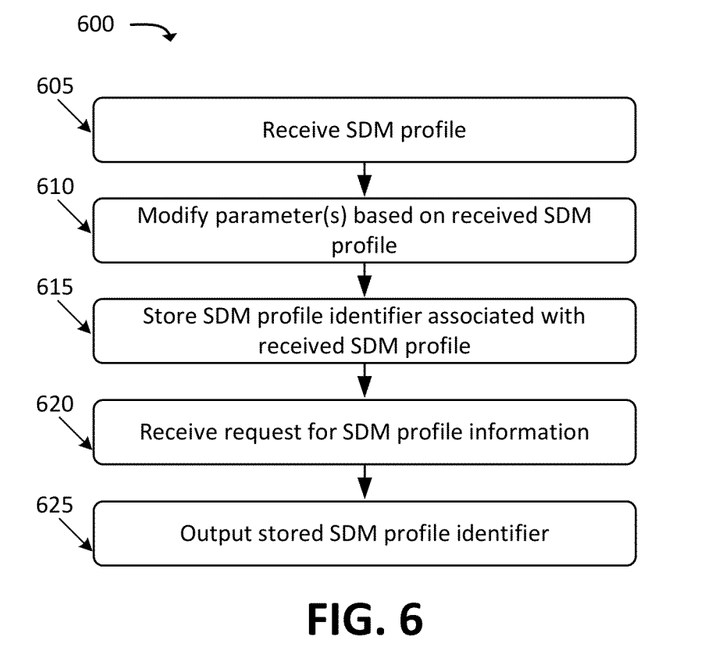
FIG. 6 illustrates an example process for modifying device parameters based on an SDM profile and for providing SDM profile information.

FIG. 6 illustrates an example process 600 for modifying device parameters based on an SDM profile and for providing SDM profile information. In some implementations, process 600 may be performed by user device 205. In some implementations, some or all of process 600 may be performed by one or more other devices in addition to, or in lieu of, user device 205.

Process 600 may include receiving (at 605) an SDM profile. For example, user device 205 may receive an SDM profile, which may include values for parameters. User device 205 may receive the SDM profile from SDM server 210 and/or from another source. In some implementations, user device 205 may receive an SDM profile as part of an initial provisioning and/or prior to delivery to a consumer (e.g., may be installed by a manufacturer or vendor of user device 205). As mentioned above, these parameters may relate to the operation of user device 205 with respect to a particular network and/or network service (e.g., SIP timers, fallback timers, retry attempts, etc.). In some implementations, the SDM profile may include an SDM profile identifier.

Process 600 may also include modifying (at 610) one or more parameters based on receiving the SDM profile. For example, user device 205 may modify parameters, associated with user device 205, based on the parameters received at 605. For example, user device 205 may modify existing values for parameters. In some implementations, the SDM profile may be implemented according to an OMA DM standard, and user device 205 may also implement the OMA DM standard, in order to modify the parameters.

Figure 7A:
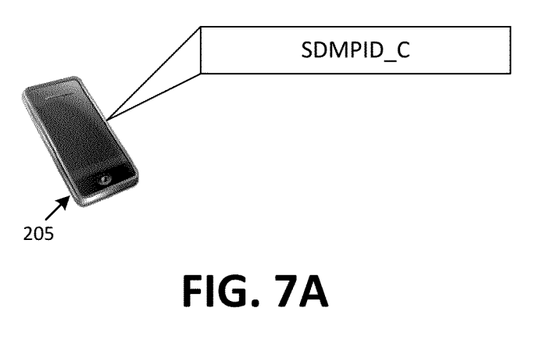
FIGS. 7A and 7B conceptually illustrate examples of SDM profile identification information that may be stored by a user device.
Figure 7B:
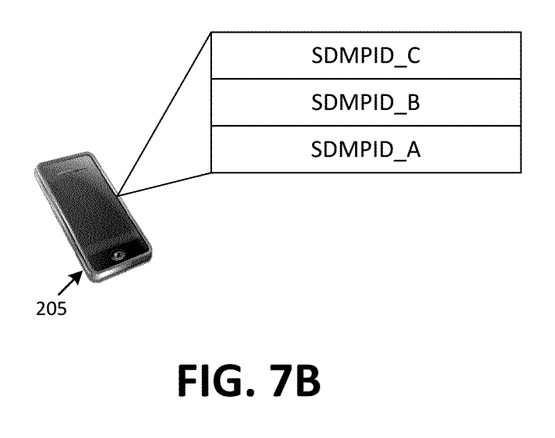

Process 600 may further include storing (at 615) an SDM profile identifier associated with the received SDM profile. For example, user device 205 may store the SDM profile identifier in a DevDetail object (e.g., as described above with respect to FIG. 4A), a DevInfo object (e.g., as described above with respect to FIG. 4B), and/or in another data structure. In some implementations, user device 205 may overwrite a previous SDM profile identifier with the SDM profile identifier received at 605. In other implementations, user device 205 may store multiple SDM profile identifiers. For example, FIGS. 7A and 7B illustrate examples of SDM profile identifiers that may be stored by a user device, after the user device has received multiple SDM profiles. Assume that FIGS. 7A and 7B illustrate a particular user device 205, after user device 205 has received three SDM profiles, corresponding to the respective SDM profile identifiers: "SDMPID_A," "SDMPID_B," and "SDMPID_C." As shown in FIG. 7A, according to some implementations, user device 205 may store only the most recent SDM profile identifier (i.e., "SDMPID_C," in this example). As shown in FIG. 7B, in some implementations, user device 205 may store more than one SDM profile identifier (e.g., "SDMPID_A," "SDMPID_B," and "SDMPID_C," in this example).

Storing multiple SDM profile identifiers may be useful in some circumstances. For example, storing multiple SDM profile identifiers may be useful for troubleshooting, or other types of analysis. Additionally, multiple SDM profiles may be associated with non-overlapping sets of parameters. In these situations, multiple SDM profile identifiers may be used to determine a full set of SDM parameters associated with a particular user device 205. In some implementations, one SDM profile may be marked as "active," and/or other SDM profiles may be marked as "inactive."

Process 600 may additionally include receiving (at 620) a request for SDM profile information. For example, user device 205 may receive a request from SDM server 210 and/or from another source. For example, user device 205 may receive a request from a customer care representative for the SDM profile information (e.g., when a user of user device 205 contacts the customer care representative, in order to troubleshoot potential issues with user device 205). As another example, user device 205 may receive a request from a user of user device 205 (e.g., via a user interface displayed by user device 205).

Process 600 may also include outputting (at 625) the stored SDM profile identifier. For example, user device 205 may output the SDM profile identifier to a requestor (e.g., a requestor from which the request was received at 620). In some implementations, user device 205 may output the SDM profile via network 215. In some implementations, user device 205 may present information regarding the SDM profile via a display screen associated with user device 205. When presenting the information via the display screen, user device 205 may additionally, or alternatively, display information regarding SDM parameters, associated with the SDM profile(s) stored by user device 205. In some implementations, when outputting the SDM profile identifier, user device 205 may output a DevDetail object (e.g., as described above with respect to FIG. 4A), a DevInfo object (e.g., as described above with respect to FIG. 4B), etc., that includes the SDM profile identifier.

Figure 8:
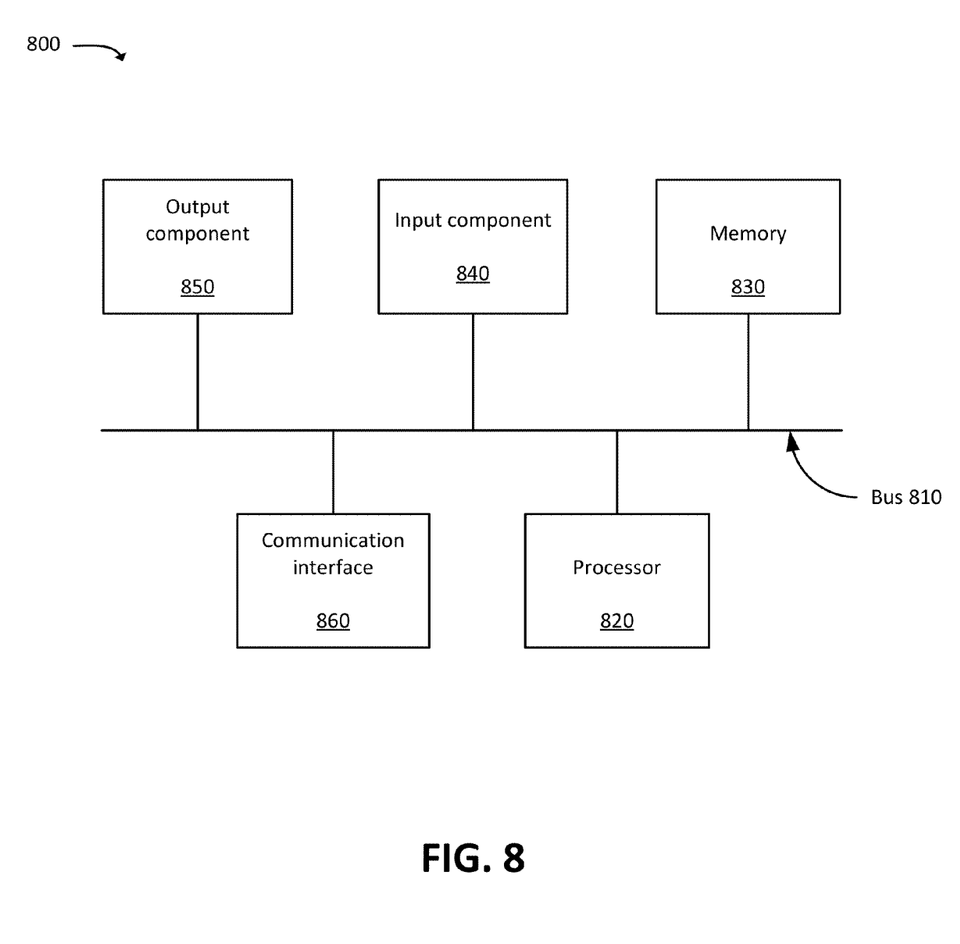
FIG. 8 illustrates example components of a device, in accordance with some implementations described herein.

FIG. 8 is a diagram of example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel.

Additionally, while examples of data structures are illustrated in FIGS. 3, 4A, and 4B as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms), Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a server device, profile identifiers from a set of user devices that are configured to attach to a wireless telecommunications network;
   identifying, by the server device and based on the profile identifiers, one or more user devices, of the set of user devices, for which updated parameters should be provided, the parameters relating to operation of the one or more user devices with respect to the telecommunications network, wherein identifying the one or more user devices includes:
      comparing the profile identifiers, received from the one or more user devices, with an up-to-date profile identifier that includes a first alphanumeric string, and
      determining that the profile identifiers, received from the one or more user devices, do not match the up-to-date profile identifier,
         wherein a particular profile identifier, associated with a particular user device, of the one or more user devices, comprises a second alphanumeric string,
         wherein determining that the profile particular profile identifier, associated with the particular user device, does not match the up-to-date profile identifier, includes determining that the first alphanumeric string does not match the second alphanumeric string; and
   providing, by the server device and to the identified one or more user devices, the updated parameters.

2. The method of claim 1, wherein the providing causes the particular user device to modify a set of parameters, associated with the particular user device, based on the updated parameters.

3. The method of claim 2, wherein the one or more user devices and the server device implement an Open Mobile Alliance Device Management ("OMA DM") standard.

4. The method of claim 3, wherein receiving the profile identifier, associated with a particular user device, includes receiving at least one of:
   an OMA DM DevDetail object that includes the profile identifier associated with the particular user device, or
   an OMA DM Devinfo object that includes the profile identifier associated with the particular user device.

5. The method of claim 1, wherein the updated parameters include parameters regarding at least one of a timer, or a quantity of retry attempts for a particular type of communication.

6. The method of claim 1, further comprising:
   outputting a request, to the particular user device, for a profile identifier associated with the particular user device,
   wherein the particular profile identifier is received from the particular user device in response to the request.

7. A server device, comprising:
   a memory device storing a set of processor-executable instructions; and
   a processor configured to execute the processor-executable instructions, wherein executing the computer-executable instructions causes the processor to:
      receive profile identifiers from a set of user devices that are configured to attach to a wireless telecommunications network;
      identify, based on the profile identifiers, one or more user devices, of the set of user devices, for which updated parameters should be provided, the parameters relating to operation of the one or more user devices with respect to the telecommunications network, wherein executing the processor-executable instructions, to identify the one or more user devices, further causes the processor to:
         compare the profile identifiers, received from the one or more user devices, with an up-to-date profile identifier that includes a first alphanumeric string, and
         determine that the profile identifiers, received from the one or more user devices, do not match the up-to-date profile identifier,
            wherein a particular profile identifier, associated with a particular user device, of the one or more user devices, comprises a second alphanumeric string,
            wherein executing the processor-executable instructions, to determine that the profile particular profile identifier, associated with the particular user device, does not match the up-to-date profile identifier, further causes the processor to determine that the first alphanumeric string does not match the second alphanumeric string; and
      provide, to the identified one or more user devices, the updated parameters.

8. The server device of claim 7, wherein the providing causes the particular user device to modify a set of parameters, associated with the particular user device, based on the updated parameters.

9. The server device of claim 8, wherein the one or more user devices and the server device implement an Open Mobile Alliance Device Management ("OMA DM") standard.

10. The server device of claim 9, wherein executing the processor-executable instructions, to receive the profile identifier, associated with a particular user device, further causes the processor to receive at least one of:
   an OMA DM DevDetail object that includes the profile identifier associated with the particular user device, or
   an OMA DM DevInfo object that includes the profile identifier associated with the particular user device.

11. The server device of claim 7, wherein the updated parameters include parameters regarding at least one of a timer, or a quantity of retry attempts for a particular type of communication.

12. A system, comprising:
a user device, configured to:
receive and store a set of parameters related to communicating with a telecommunications network,
store an identifier associated with the set of parameters, the identifier including a first alphanumeric string, and
output the identifier to a server device; and
a server device, configured to:
receive the identifier from the user device,
determine, based on the received identifier, that the user device has not stored up-to-date parameters, wherein when determining whether the user device has stored up-to-date parameters, the server device is further configured to:
compare the identifier, received from the user device, with an up-to-date profile identifier that includes a second alphanumeric string, and
determine, based on the comparing, that the first alphanumeric string does not match the second alphanumeric string, and
provide, to the user device, a set of updated parameters based on the determination that the user device has not stored up-to-date parameters.

13. The system of claim 12, wherein the user device and the server device implement an Open Mobile Alliance Device Management ("OMA DM") standard, wherein outputting the identifier to the server device includes outputting an OMA DM DevDetail object that includes the identifier.

14. The system of claim 12, wherein, the set of parameters include parameters regarding at least one of a timer, or a quantity of retry attempts for a particular type of communication.

15. The system of claim 12, wherein, outputting the identifier to the server device is performed based on a request, by the server device, for the identifier.

16. The system of claim 12, wherein outputting the identifier to the server device is performed independent of a request, by the server device, for the identifier.

17. The system of claim 12, wherein storing the set of parameters includes overwriting a previously received set of stored parameters.

18. The system of claim 12, wherein the user device and the server device implement an Open Mobile Alliance Device Management ("OMA DM") standard, wherein outputting the identifier to the server device includes outputting an OMA DM DevInfo object that includes the identifier.

19. The system of claim 12, wherein the providing causes the particular user device to modify a set of parameters, stored by the user device, based on the set of updated parameters.

20. The system of claim 12, wherein the updated parameters include parameters regarding at least one of a timer, or a quantity of retry attempts for a particular type of communication.

* * * * *